US007986454B1

(12) United States Patent
Korenblit et al.

(10) Patent No.: US 7,986,454 B1
(45) Date of Patent: Jul. 26, 2011

(54) TUNABLE TERAHERTZ GENERATOR USING A MAGNON GAIN MEDIUM WITH AN ANTENNA

(75) Inventors: Yehiel Korenblit, Netanya (IL); Boris G. Tankhilevich, Walnut Creek, CA (US)

(73) Assignee: Terahertz Technologies LLC, Walnut Creek, CA (US)

( * ) Notice: Subject to any disclaimer, the term of this patent is extended or adjusted under 35 U.S.C. 154(b) by 412 days.

(21) Appl. No.: 12/315,424

(22) Filed: Dec. 2, 2008

Related U.S. Application Data

(63) Continuation-in-part of application No. 12/290,527, filed on Nov. 1, 2008, which is a continuation-in-part of application No. 11/701,284, filed on Jan. 31, 2007, now Pat. No. 7,508,578, which is a continuation-in-part of application No. 11/481,197, filed on Jul. 3, 2006, now Pat. No. 7,430,074.

(51) Int. Cl.
*H01S 3/00* (2006.01)
*H01S 5/00* (2006.01)
*H01S 3/09* (2006.01)

(52) U.S. Cl. .......... 359/342; 372/37; 372/43.01; 372/69

(58) Field of Classification Search .................. 359/342; 372/37, 43.01, 69
See application file for complete search history.

(56) References Cited

U.S. PATENT DOCUMENTS

| | | |
|---|---|---|
| 3,822,410 A | 7/1974 | Madey |
| 3,986,194 A | 10/1976 | Masumoto et al. |
| 4,626,800 A | 12/1986 | Murakami et al. |
| 4,679,023 A | 7/1987 | Nelson |
| 4,914,665 A | 4/1990 | Sorin |
| 6,111,416 A | 8/2000 | Zhang et al. |
| 6,230,038 B1 | 5/2001 | von Gutfeld et al. |
| 6,365,286 B1 | 4/2002 | Inomata |
| 6,614,827 B1 | 9/2003 | Mooradian |
| 6,912,148 B2 | 6/2005 | Hannah et al. |
| 6,988,058 B1 | 1/2006 | Sherwin et al. |
| 2001/0031547 A1 | 10/2001 | Ohno et al. |
| 2002/0058120 A1 | 5/2002 | Uchida et al. |
| 2003/0021908 A1 | 1/2003 | Nickel et al. |
| 2004/0094801 A1 | 5/2004 | Liang et al. |
| 2005/0242287 A1 | 11/2005 | Hakimi |
| 2006/0060815 A1 | 3/2006 | Punnoose |
| 2006/0088324 A1 | 4/2006 | Fujimoto et al. |
| 2006/0108619 A1 | 5/2006 | Yoshida et al. |
| 2006/0238191 A1 | 10/2006 | Saito |
| 2006/0292704 A1* | 12/2006 | Bailleul et al. .................... 438/3 |

OTHER PUBLICATIONS

V. G. Vaks, A. I. Larkin, and S. A. Pikin, "Spin Waves and Correlation Functions in a Ferromagnetic", Zh. Eksp. Teor. Fiz. (U.S.S.R.) 53, 1089-1106 (Sep. 1967), p. 647-655.

(Continued)

*Primary Examiner* — Eric Bolda
(74) *Attorney, Agent, or Firm* — Boris G. Tankhilevich

(57) ABSTRACT

An apparatus and method for tunable generation of terahertz waves at room temperatures are provided. The apparatus for tunable terahertz generation comprises: (A) a terahertz antenna further comprising a magnon gain medium; (B) a means for generating the nonequilibrium magnons in the magnon gain medium; wherein the terahertz antenna is configured to emit generated terahertz photons; and (C) a means for tuning frequency of terahertz photons emitted by the terahertz antenna. The magnon gain medium is selected from the group consisting of: {a ferromagnetic semiconductor; a dilute magnetic semiconductor (DMS); a half-metallic ferromagnet (HMF); and a ferromagnetic conductor, with a gap in the density of states of the minority electrons around the Fermi energy}.

46 Claims, 3 Drawing Sheets

OTHER PUBLICATIONS

Y. Noda and Y. Ishikawa, "Spin Waves in Heusler Alloys Pd2MnSn and Ni2MnSn", Journal of the Physical Society of Japan, Mar. 3, 1976, p. 690-698, vol. 40—No. 3, Japan.

Y. Noda and Y. Ishikawa, "Spin Dynamics in a Heusler Alloy Pd2MnSn", Journal of the Physical Society of Japan, Mar. 3, 1976, p. 699-705, vol. 40—No. 3, Japan.

K. Tajima, Y. Ishikawa, and P. J. Webster, "Spin Waves in a Heusler Alloy Cu2MnAl", Journal of the Physical Society of Japan, Aug. 2, 1977, p. 483-489, vol. 43—No. 2, Japan.

S. Wurmehl, G. H. Fecher, H. C. Kandpal, V. Ksenofontov, C. Felser, H.J. Lin, and J. Morais, "Geometric, electronic, and magnetic structure of CO2FeSi: Curie temperature and magnetic moment measurements and calculations", Physical Review B, 2005, p. 184434, vol. 72.

U.S. Appl. No. 12/290,527: Office Action—Election/Restrictions dated Oct. 1, 2010.

U.S. Appl. No. 12/290,527: Office Action dated Dec. 3, 2010.

Korenblit et al. "Generation of High-Frequency Magnons by NonEquilibrium Electrons Polarized Opposite to the Direction of Magnetization", Soviet Physics, JETP, vol. 46(6), Dec. 1977.

Korenblit et al. "High Frequency Magnon Generation by NonEquilibrium Electrons and the Instability of the Magnon System", Physics Letters, vol. 64A, No. 3, pp. 307-330, Dec. 1977.

Tankhilevich et al. "Terahertz Imaging and Spectroscopy: Advances in Power and Tunability", Proceedings of the 2010 World Molecular Imaging Congress, vol. 12, Suppl 2, pp. S1340, Dec. 2010.

U.S. Appl. No. 11/481,197: Office Action—Election/Restrictions dated Jun. 5, 2007.

U.S. Appl. No. 11/481,197: Office Action dated Aug. 31, 2007.

U.S. Appl. No. 11/481,197: Notice of Allowance and Fee(s) Due dated Feb. 22, 2008.

U.S. Appl. No. 11/496,889: Notice of Allowance and Fee(s) Due dated Jun. 30, 2008.

U.S. Appl. No. 11/701,284: Office Action dated Mar. 6, 2008.

U.S. Appl. No. 11/701,284: Notice of Allowance and Fee(s) Due dated Oct. 6, 2008.

U.S. Appl. No. 11/799,937: Notice of Allowance and Fee(s) Due dated Oct. 9, 2008.

M. J. Lisowski, "Electron and Magnetisation Dynamics in Metals Studied by Time-Resolved Photoemission", Dissertation Abstract, Freie Universitat Berlin, Jan. 2006, Berlin Germany.

I. E. Radu, "Ultrafast Electron, Lattice and Spin Dynamics on Rare-Earth Metal Surfaces", Thesis, Freie Universitat Berlin, Mar. 2006, Berlin Germany.

R. Srivastava, "Optically Detected Terahertz Resonance Spectroscopy of Semiconductor Nanostructures", Thesis, Rice University, Apr. 2005, Houston Texas.

M. Belhadi; A. Khater, "Spin Wave Modes and Magnon Scattering at Surface Nanostructure on 2D Heisenberg Ferromagnets", Surface Review and Letters, 2004, p. 99-109, vol. 11, No.

M. Tsoi; A. G. M Jansen; J. Bass; W.-C. Chiang; V. Tsoi; P. Wyder, "Generation and Detection of Phase-Coherent Current-Driven Magnons in Magnetic Multilayers", Letters to Nature, Nature, Jul. 6, 2000, p. 46-48, vol. 406, Macmillan Magazines Ltd.

U.S. Appl. No. 11/701,284: Office Action dated Mar. 6, 2008.

Tankhilevich et al. "Novel spintronic device: terahertz magnon-photon laser", Journal of Physics: Conf. Ser. 263 012004, 1st International Symposium on Spintronic Devices and Commercialization (ISSDC2010), IOP Publishing, Feb. 2011.

* cited by examiner

US 7,986,454 B1

TUNABLE TERAHERTZ GENERATOR USING A MAGNON GAIN MEDIUM WITH AN ANTENNA

This is a continuation-in-part of the U.S. patent application Ser. No. 12/290,527, filed on Nov. 1, 2008, and entitled "MAGNON LASER AT ROOM TEMPERATURES", which is a continuation-in-part of the U.S. patent application Ser. No. 11/701,284, filed on Jan. 31, 2007 now U.S. Pat. No. 7,508,578 and entitled "MAGNON LASER", which is a continuation-in-part of the parent U.S. patent application Ser. No. 11/481,197 filed on Jul. 3, 2006, now U.S. Pat. No. 7,430,074 "GENERATION OF TERAHERTZ WAVES".

TECHNICAL FIELD

The technology relates to magnon laser effect and to the generation of terahertz radiation.

BACKGROUND

In the parent U.S. Pat. No. 7,430,074 "GENERATION OF TERAHERTZ WAVES" the generation of nonequilibrium magnons was disclosed. In the U.S. patent application Ser. No. 11/701,284, filed on Jan. 31, 2007 and entitled "MAGNON LASER", the generation of nonequilibrium magnons was described by using a general laser analogy. In the U.S. patent application Ser. No. 12/290,527, filed on Nov. 1, 2008, and entitled "MAGNON LASER AT ROOM TEMPERATURES", a magnon laser that utilizes a magnon gain medium at room temperatures was disclosed.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

An apparatus and method for tunable generation of terahertz waves are provided. The apparatus for tunable terahertz generation comprises: (A) a terahertz antenna further comprising a magnon gain medium; wherein the magnon gain medium supports generation of nonequilibrium magnons; (B) a means for generating the nonequilibrium magnons in the magnon gain medium; wherein interaction between nonequilibrium magnons causes generation of photons; and wherein the terahertz antenna is configured to emit generated terahertz photons; and (C) a means for tuning frequency of terahertz photons emitted by the terahertz antenna. The magnon gain medium is selected from the group consisting of: {a ferromagnetic semiconductor; a dilute magnetic semiconductor (DMS); a half-metallic ferromagnet (HMF); and a ferromagnetic conductor, with a gap in the density of states of the minority electrons around the Fermi energy}. The half-metallic ferromagnet (HMF) is selected from the group consisting of: {a spin-polarized Heusler alloy; a spin-polarized Colossal magnetoresistance material; $CrO_2$; $Sr_2FeMoO_6$; and $Fe_3O_4$}.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Figure 1:
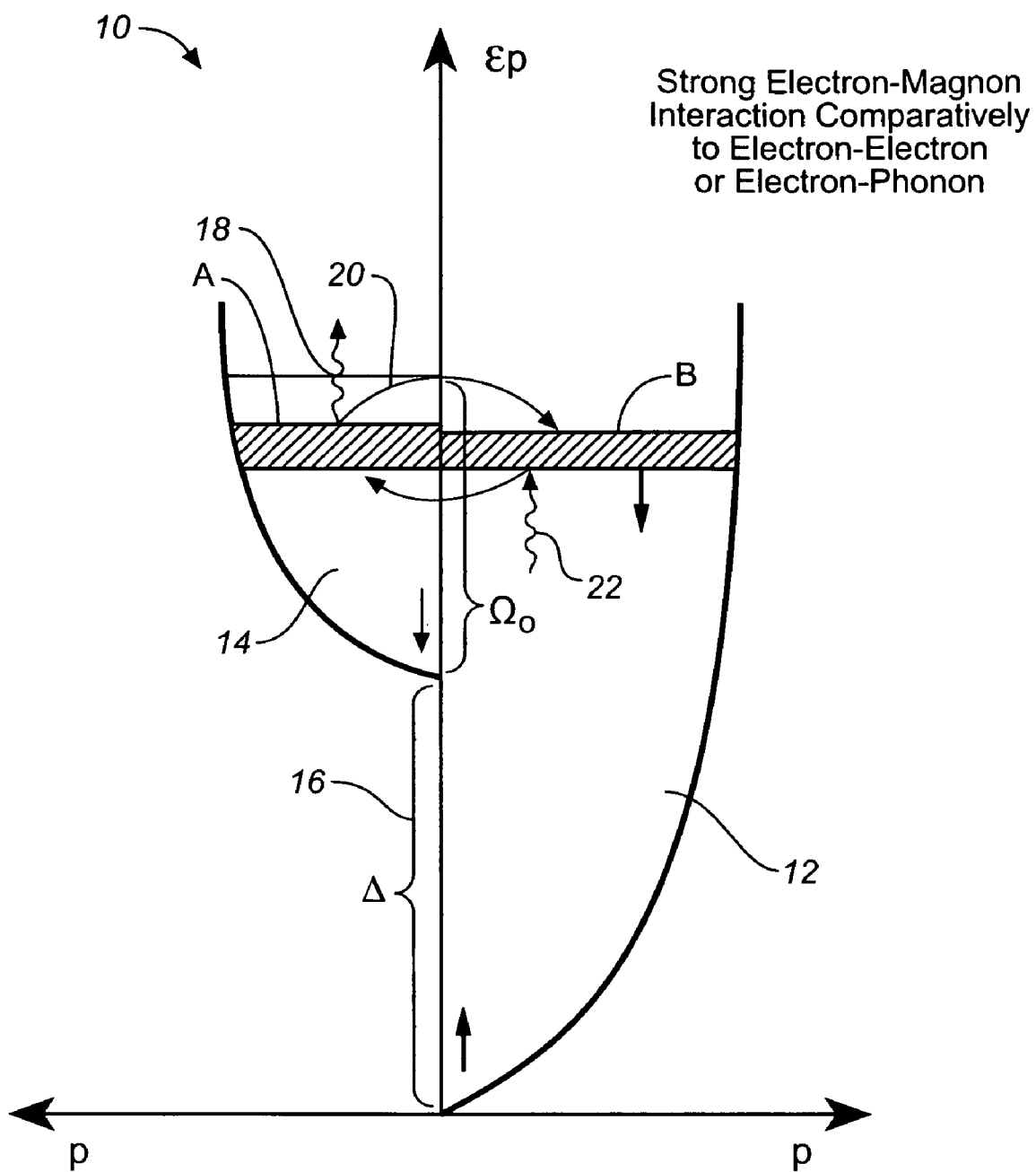
FIG. 1 illustrates process of strong electron-magnon interaction (comparatively with electron-electron or with electron-phonon interaction) wherein a nonequilibrium electron put in the upper sub-band with spin down rapidly emits a magnon with a large wave vector in accordance with an embodiment of the present technology.

Reference now be made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Recently some dilute magnetic semiconductors (DMS), with Tc above room temperature, have been studied intensively. These are oxides doped with magnetic cations. The examples are: GaN, doping Mn-9%, Tc=940 K; AlN, doping Cr-7%, Tc>600 K; TiO2 (anatase), doping Co-7%, Tc=650 K; $SnO_2$, doping Co-5%, Tc=650 K. These magnets can be used as a magnon gain medium to generate nonequilibrium magnons and photons at room temperatures.

Another system that can be used as a magnon gain medium is a system comprising a half-metallic ferromagnet (HMF). Half-metallic ferromagnets (HMF) are ferromagnetic conductors, with a gap in the density of states of the minority electrons around the Fermi energy, $E_f$. Thus, the electrons in these materials are supposed to be 100% spin polarized at $E_f$. Thermal effects and spin-orbital interactions reduce the electron polarization. However, the electron polarization is close to 100% in half-metallic ferromagnets with spin-orbital interaction smaller than the minority electron gap, and at temperatures much lower than the Curie temperature Tc.

Half-metallic ferromagnets (HMF) form a quite diverse collection of materials with very different chemical and physical properties.

Chromium dioxide, $CrO_2$. Tc=390 K. Magnetic moment per $Cr=2\mu_B$, where $\mu_B$ is the Bohr magneton.
magneton Bora. The polarization measured at low temperatures is close to 100%. There are some other known half-metallic ferromagnetic oxides, e.g. $Sr_2FeMoO_6$.

Heusler alloys. Most of the predicted HMF are Heusler alloys. In general, these are ternary $X_2YZ$-compounds, X and Y are usually transition metals and Z is a main group element. The most studied of them is NiMnSb: Tc=728K, magnetic moment close to $4\mu_B$. Experiments show that NiMnSb is a half-metallic ferromagnet at low temperatures. But there is evidence that at T≈90K a phase transition into a usual ferromagnetic state takes place, and it seems unlikely that NiMnSb is a half-metallic ferromagnet near room temperature.

There are many other Heusler alloys with half-metallic ferromagnet properties, like: (1) $Co_2MnSi$ having Tc of 1034K and magnetic moment of $5\mu_B$; (2) $Co_2MnGe$ having Tc of 905K and magnetic moment close to $5\mu_B$; and (3) $Co_2MnSn$ having Tc of 826K and magnetic moment of $5.4\mu_B$; etc.

It has been shown recently (S. Wurmehl et al., *PRB* 72, 184434 (2005)), that the alloy with the highest magnetic moment and Tc is $Co_2FeSi$ having Tc of 1100 K (higher than for Fe), and having magnetic moment per unit cell of $6\mu_B$. The orbital contribution to the moments is small, while the exchange gap is large, of order 2 eV. Therefore, the effect of thermal fluctuations and spin-orbit interaction on the electron polarization is negligible. One should expect, therefore, that the electrons in $Co_2FeSi$ are polarized at high temperatures, sufficiently close to Tc. Indeed, according to the experiment the magnetic moment at 300 K is the same as at 5K.

Colossal magnetoresistance materials: $La_{1-x}Sr_xMnO_3$ (for intermediate values of x) is presumably a half-metallic ferromagnet having Tc close to room temperature. Photoelectron emission experiments confirm the half-metallicity of $La_{0.7}Sr_{0.3}MnO_3$, with Tc=350 K. The polarization degree at T=40K is 100±5%, the gap for the minority spins is 1.2 eV.

Note that HMF, as well as ferromagnetic semiconductors, differ from "normal" metallic ferromagnets by the absence of one-magnon scattering processes. Therefore, spin waves in HMF, as well as in magnetic insulators, are well defined in the entire Brillouin zone. This was confirmed by neutron scattering experiments performed on some Heusler alloys. For references, please see: (1) Y. Noda and Y. Ishikawa (*J. Phys. Soc. Japan* v. 40, 690, 699 (1976)) have investigated the following Heusler alloys: $Pd_2MnSn$ and $Ni_2MnSn$. (2) K. Tajima et al. (*J. Phys. Soc. Jap.* v. 43, 483 (1977)), have investigated Heusler alloy $Cu_2MnAl$.

Hence, the magnon laser effect (disclosed in the parent U.S. Pat. No. 7,430,074 "GENERATION OF TERAHERTZ WAVES") can be observed (in at least some of the referenced above half-metals) at room temperatures.

However, in half-metals the spin up electron (in the sub-band 36 of FIG. 2 or in the sub-band 38 of FIG. 3) with energy larger than the exchange gap will interact with the spin up electrons with energy smaller than the gap. Since the number of the spin up electrons is large (as compared to the number of spin up electrons in ferromagnetic semiconductors) this interaction should lead to the fast thermalisation of high-energy electrons, which will prevent the reverse process of absorption of magnons by electrons with spin up, which is crucial for existence of the magnon laser.

In other words, the electron bath in half-metallic ferromagnets could play the same role as the optical phonons in ferromagnetic semiconductors. However, in half-metallic ferromagnetic oxides the interaction of the electrons with spin up with optical phonons could also play an important role.

As illustrated in FIG. 1A nonequilibrium electron 20 put in the upper sub-band with spin down rapidly emits a magnon 18. Assuming that the emitted non-equilibrium magnon 18 still has quadratic spectrum, it has a large wave vector $q \approx \hbar^{-1}(2m\Delta)^{1/2}$, where m is the electron effective mass. It follows from the energy and momentum conservation laws that if the energy of this electron, $\epsilon_p$, measured from the bottom of the spin down sub-band is much smaller than $\Delta$, the wave vector of the emitted magnon, q lies in the interval $q_1 \leq q \leq q_2$, where $q_{1,2}=\hbar^{-1}(p_0 \pm p)$, $p_0=(2m\Delta)^{1/2}$, $p=(2m\epsilon_p)^{1/2} \ll p_0$. The frequency of these magnons may be in the Terahertz region.

The ratio of the magnon generation rate, $\Gamma_e(\vec{q})$, to the rate of $\Gamma_m(\vec{q})$, their relaxation (in collisions with equilibrium magnons) is a function of the wave vector $\vec{q}$. Therefore the nonequilibrium magnon distribution function, $N(\vec{q})$ has a maximum at some wave vector $\vec{q}=\vec{q}^*$. $N(\vec{q})$ increases with the increase of the electron pumping, and because of the simulated emission of magnons, the function $N(\vec{q})$ grows most rapidly at $\vec{q}$ close to $\vec{q}^*$.

When the pump reaches some critical value, $N(\vec{q}^*)$ starts to increase very fast with the increase of the electron pumping. At some conditions the generation of magnons with $\vec{q}=\vec{q}^*$ becomes avalanche-like, and the magnon system becomes unstable. For more details, please see U.S. Pat. No. 7,430,074 "GENERATION OF TERAHERTZ WAVES", and equations below.

Basic Equations for Magnon Generation.

The system of equations which govern the behavior of the electron, $f_\downarrow(\vec{p})$, and magnon, $N(\vec{q})$ distribution functions were obtained in the following paper: I. Ya. Korenblit and B. G. Tankhilevich, Sov. Phys. -JETP, 46, 1167 (1977). They read $$[1+N(\vec{q})]\Gamma_e(\vec{q})-[N(\vec{q})-N^{(0)}(\vec{q})]\Gamma_m(\vec{q})=0$$

$$f_\downarrow(\vec{p})\gamma_{em}(\vec{p})=g(\epsilon_p). \qquad \text{(Eqs. 1)}$$

Here $\Gamma_e(\vec{q})$ is the rate of relaxation of magnons in collisions with electrons $$\Gamma_e(\vec{q})=4\pi\hbar^{-1}I^2Sv_0\int d^3p(2\pi\hbar)^{-3}\delta(\gamma_\uparrow(\vec{p}-\hbar\vec{q})|\epsilon_{\vec{p}\downarrow}-\hbar\omega_{\vec{q}}^{-}-\epsilon_{\vec{p}-\hbar\vec{q},\uparrow}^{-})f_\downarrow(\vec{p}), \qquad \text{(Eq. 2)}$$

where $v_0$ is the unit cell volume.

$\gamma_{em}$ is the electron-magnon relaxation rate:

$$\gamma_{em}(\vec{p})=4\pi\hbar^{-1}I^2Sv_0\int d^3q(2\pi\hbar)^{-3}\delta(\gamma_\uparrow(\vec{p}-\hbar\vec{q})|\epsilon_{\vec{p}\downarrow}-\hbar\omega_{\vec{q}}^{-}-\epsilon_{\vec{p}-\hbar\vec{q},\uparrow}^{-})(1+N(\vec{q})), \qquad \text{(Eq. 3)}$$

The smeared $\delta$-function, $\delta(\gamma|\epsilon)$, takes into account the finite lifetime of the electrons in the final state, caused by the interaction with electrons with spin up (or by the interaction with optical phonons). In the case of electron thermalisation due to interaction with optical phonons $$\delta(\gamma|\epsilon)=1/\pi\,\hbar\gamma/(\epsilon^2+\hbar^2\gamma^2) \qquad \text{(Eq. 4)}$$

The rate $\gamma_\uparrow$. $(p,\epsilon_p)$ is the known electron damping rate due to the emission of longitudinal optical phonons (22 of FIG. 1). For electrons with energy $\epsilon_p$ close to $\Delta$, this rate is given by $$\gamma_\uparrow(\epsilon_p)=(\pi/2)\alpha\Omega(\Omega/\Delta)^{1/2}\ln(4\Delta/\Omega) \ll \Delta. \qquad \text{(Eq. 5)}$$

Here $\Omega$ is the energy of an optical phonon, and $\alpha$ is the strength of the electron-phonon interaction.

The function $g(\epsilon)$ is the generation function of electrons, with spin down. We shall treat it as a $\delta$-function $$g(\epsilon_p)=g_0\epsilon\delta(\epsilon-\epsilon_p) \qquad \text{(Eq. 6)}$$

We suppose in what follows that the energy $\epsilon$ is small, $\epsilon \ll \Delta$.

The second term in the l.h.s. in the first of Eqs. (1) describes the relaxation of nonequilibrium magnons in collisions with equilibrium ones, under the assumption that $N(\vec{q})$, is close to its equilibrium value, $$N^{(0)}(\vec{q})=[e^{(\hbar\omega_q/kT)}-1]-1. \tag{Eq. 7}$$

$\Gamma_m(\vec{q})$ is the magnon-magnon relaxation rate. From Eqs. (1) we obtain the following integral equation for $N(\vec{q})$, $$N(\vec{q})=(N^0(\vec{q})+\Gamma_e(\vec{q})/\Gamma_m(\vec{q}))(1-\Gamma_e(\vec{q})/\Gamma_m(\vec{q}))^{-1}, \tag{Eq. 8}$$

where $$\Gamma_e(\vec{q})=g_0\!\int\!d^3p\delta(\gamma_\uparrow(\vec{p}-\hbar\vec{q})|\in_{p\downarrow}^\rightarrow-\hbar\omega_{\vec{q}}^\rightarrow-\in_{\vec{p}_-\hbar\vec{q},\uparrow}^\rightarrow)\delta(\in-\in_p)Z^{-1}(\vec{p}), \tag{Eq. 9}$$

and $$Z(\vec{p})=\!\int\!d^3q\delta(\gamma_\uparrow(\vec{p}-\hbar\vec{q})|\in_{p\downarrow}^\rightarrow-\hbar\omega_{\vec{q}}^\rightarrow-\in_{\vec{p}_-\hbar\vec{q},\uparrow}^\rightarrow)(1+N(\vec{q})) \tag{Eq. 10}$$

Eq. (8) is formally reminiscent of the expression for the magnon distribution function under conditions of parametric pumping. The difference is that here the rate $\Gamma_e$ is itself a functional of $N(\vec{q})$, since the number of the emitted magnons depends on the distribution function of the electrons with spin down, $f_\downarrow$, which according to Eqs. (2) and (3) is in its turn determined not only by the pump $g(\in_p)$ but also by a certain average (10) over the magnon distribution function. The behavior of $N(\vec{q})$ is therefore different from that in the case of parametric pumping.

$N(\vec{q})$ For Strong Pumping. Isotropic Case.

Let us assume for simplicity that the magnon and electron spectra are isotropic. Then $\Gamma_e(q)$ and $\Gamma_m(q)$ do not depend on the direction of $\vec{q}$. The relaxation rate $\Gamma(q)$ is usually a power function of q, and it can be written as $$\Gamma_m(q)=\Gamma_m(p_0)(\hbar q/p_0)^t. \tag{Eq. 11}$$

More specifically, if $\Gamma_m(q)$ is determined by magnon-magnon exchange scattering, then t=4 for magnons, with energy $\hbar\omega(q_0)$ larger than kT, and t=3 for magnons, with energy $\hbar\omega(q_0)$ smaller than kT.

The strong pumping regime sets in, when $g_0$ exceeds a critical value $G_c$. If the damping of electrons is due to interaction with optical phonons (and is less than $(\in\Delta)^{1/2}$), this critical value is given by $$G_c=2g_c/(t+1),$$

$$g_c=(\Delta/\in)^{3/2}\Gamma_m(q_0)[1+N^{(0)}(q_0)]. \tag{Eqs. 12}$$

If the magnon mirrors are implemented (please, see the U.S. patent application Ser. No. 11/799,937, filed on May 2, 2007, and entitled "DYNAMICS OF TERAHERTZ RADIATION), the critical pumping rate ($g_c^{magnon\ mirrors}$) is easier to achieve: $g_c^{magnon\ mirrors}=4(\Delta/\in)^{1/2}\beta_c^{no\ magnon\ mirrors}$.

At $g_0 > G_c$ the function $N(q)$ increases exponentially with pumping $$N(q)=[1+N^{(0)}(q_0)](p_0/2p_\in(t+1))\exp(g_0/G_c), \tag{Eq. 13}$$

if q falls into the smooth region $$p_0-p_\in\leq\hbar q\leq p_0-p_\in+\delta\hbar q,$$

$$\delta\hbar q=2p_\in\exp(-g_0/G_c), \tag{Eqs. 14}$$

while $N(q)$ with wave vectors outside of the above-given range does not depend on the pump. Thus, under sufficiently strong pumping the magnon distribution function has a sharp peak at $\hbar q\approx p_0-p_\in$.

Let us define the number of electrons, $\beta$, pumped per second per unit cell as:

$$\beta=v_0(2\pi\hbar)^{-3}\!\int\!d^3p\ g(\in_p). \tag{Eq. 15}$$

One gets for the pumping given by Eq. (6)

$$\beta=(v_0\in^{3/2}m^{3/2}g_0/2^{1/2}\pi^2\hbar^3) \tag{Eq. 16}$$

and the critical pumping $\beta_c$, with $g_0=G_c$ is $$\beta_c=(v_0q^3_0/(2(t+1)\pi^2))\Gamma_m(q_0)[1+N^{(0)}(q_0)]. \tag{Eq. 17}$$

Since we are interested in high-frequency magnons, we suppose that their relaxation is mainly due to four-magnon exchange interaction. Using the expressions for $\Gamma_m$ given in the following reference (V. G. Vaks, A. I. Larkin and S. A. Pikin, JETP 53 (1967)), we estimated for T/Tc≈0.2, and $\hbar\omega(q_0)>kT$, $N^{(0)}(q_0)\ll 1$: $\Gamma_m\approx(10^8-10^9)$ sec$^{-1}$.

Thus, it follows from Eq. (17) the estimate $\beta_c\approx(10^5-10^7)$ sec$^{-1}$, and we took into account that $N^{(0)}(q_0)$ is small.

The physical meaning of the critical pumping $G_c$ can be understood as follows. The ratio $\Gamma_e/\Gamma_m$ of the rate of generation of the magnons to the rate of their relaxation reaches its maximum value at $\hbar q=p_0-p_\in$ and has its minimum at $\hbar q=p_0+p_\in$, i.e. there is an excess generation on the left end of the interval in comparison with the right end. Stimulated emission causes the increase of this asymmetry. Nonlinear generation begins when the difference between the number of nonequilibrium magnons at the ends of the generation interval becomes equal to the number of equilibrium magnons, if $N^{(0)}>1$. On the other hand, nonlinear generation begins when the difference between the number of nonequilibrium magnons at the ends of the generation interval becomes equal to 1, if the opposite inequality ($N^{(0)}<1$) holds.

Figure 2:
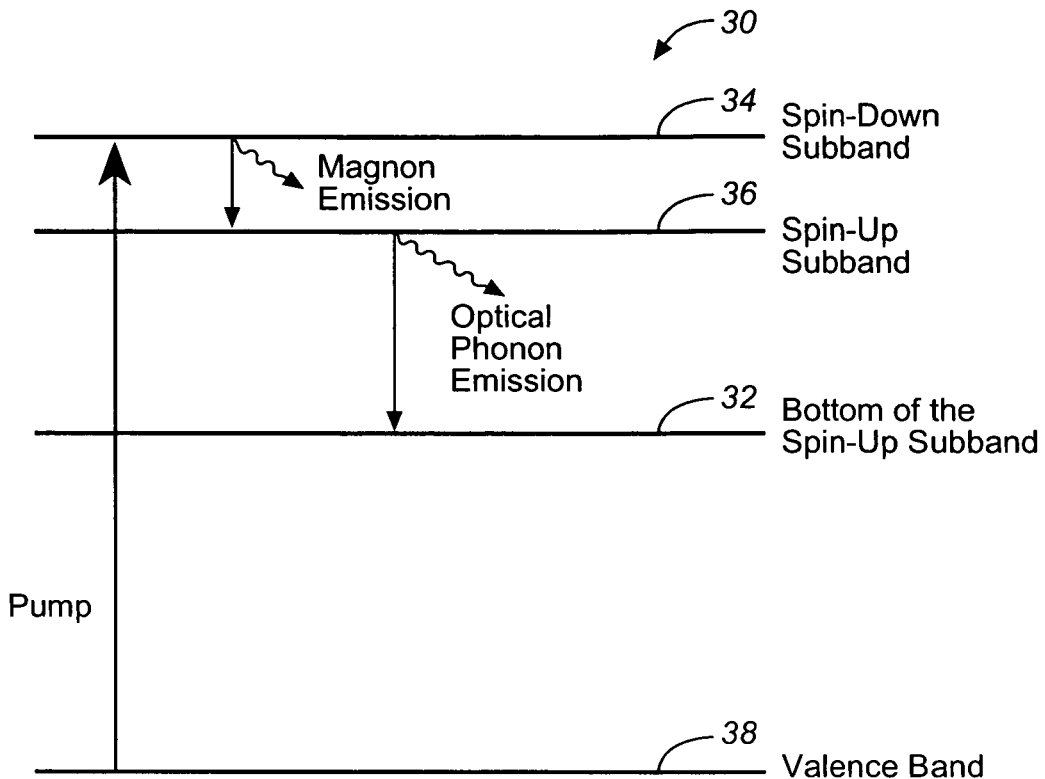
FIG. 2 shows the energy level structure of a four-level magnon laser operating at room temperatures in accordance with an embodiment of the present technology.

In an embodiment, FIG. 2 shows a diagram 30 that illustrates a four-level magnon laser of the present technology. In this embodiment of the present technology, the four-level magnon laser 30 further comprises a four-level energy structure further comprising: a lowest energy level 38 corresponding to a valence band, a highest energy level 34 corresponding to a spin down sub-band, a first intermediate level 36 corresponding to the lower energy electron states in the spin-up sub-band, and a second intermediate energy level 32 corresponding to a spin up sub-band.

The electrons pumped from the lowest energy level 38 into the highest energy level 34 move into the lower energy electron states (the first intermediate level 36) in the spin-up sub-band, wherein each pumped electron emits a magnon. The electrons in the spin up sub-band move from the first intermediate state 36 into the bottom of the spin up sub-band (the second intermediate energy level 32) by interacting with electrons with spin up (or by emitting optical phonons). The electrons are pumped from the lowest energy level 38 into the highest energy level 34 by using a pumping means (84 of FIG. 4).

In an embodiment of the present technology, a conventional laser can be used as a pumping means to pump electrons form the lowest energy level (valence band) 38 into the highest energy level 34 (spin down sub-band).

In an embodiment of the present technology, the four-level magnon laser (30 of FIG. 2) further comprises: a thermostat (88 of FIG. 4), wherein the ferromagnetic material is placed in the thermostat, and wherein the thermostat is configured to maintain temperature of the ferromagnetic material below a critical temperature.

Figure 3:
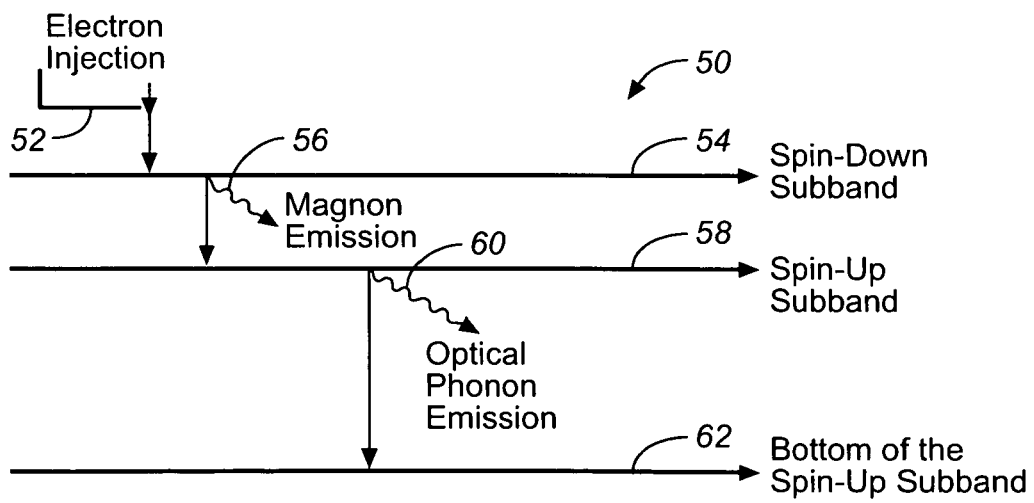
FIG. 3 depicts the energy level structure of a three-level magnon laser operating at room temperatures in accordance with an embodiment of the present technology.

In an embodiment, FIG. 3 depicts a three-level magnon laser 50 of the present technology further comprising a three-level laser structure further comprising: a highest energy level 54 corresponding to a spin down sub-band, a lowest energy level 62 corresponding to a spin up sub-band, and an intermediate energy level 58 corresponding to the lower energy electron states in the spin-up sub-band.

In this embodiment of the present technology, the electrons 52 injected from an external source of electrons (not shown) into the highest energy level 54 move into the lower energy electron states in the spin-up sub-band 58, wherein each injected electron emits a magnon. The electrons in the spin up sub-band move from the intermediate energy level 58 into the bottom of the spin up sub-band 62 by interacting with the equilibrium electrons in the spin up sub-band.

In an embodiment of the present technology, the injection means (84 of FIG. 4) further comprises: an electric field applied to the ferromagnetic material. In an embodiment of the present technology, the injection means is configured to inject non-polarized electrons from an external source into the ferromagnetic material, wherein the injected spin down electrons populate the highest energy level 54. In another embodiment of the present technology, the injection means is configured to inject polarized spin down electrons from an external source into the highest energy level 54. The polarized spin down electrons are polarized in the direction opposite to the direction of magnetization of the ferromagnetic material.

In an embodiment, the three-level magnon laser of the present technology (50 of FIG. 3) further comprises a thermostat (88 of FIG. 4), wherein the ferromagnetic material is placed in the thermostat, and wherein the thermostat is configured to maintain temperature of the ferromagnetic material below a critical temperature.

In an embodiment, the four-level magnon laser of the present technology (30 of FIG. 2) can be used for generation of nonequilibrium magnons by performing the following steps (not shown): (A) providing the four-level magnon laser; and (B) pumping electrons into the four-level magnon laser from the lowest energy level into the highest energy level by using a pumping means (84 of FIG. 4).

In an embodiment, the three-level magnon laser of the present technology (50 of FIG. 3) can be used for generation of nonequilibrium magnons by performing the following steps (not shown): (A) providing the three-level magnon laser; and (B) injecting electrons into the three-level magnon laser by using an injection means (84 of FIG. 4).

Figure 4:
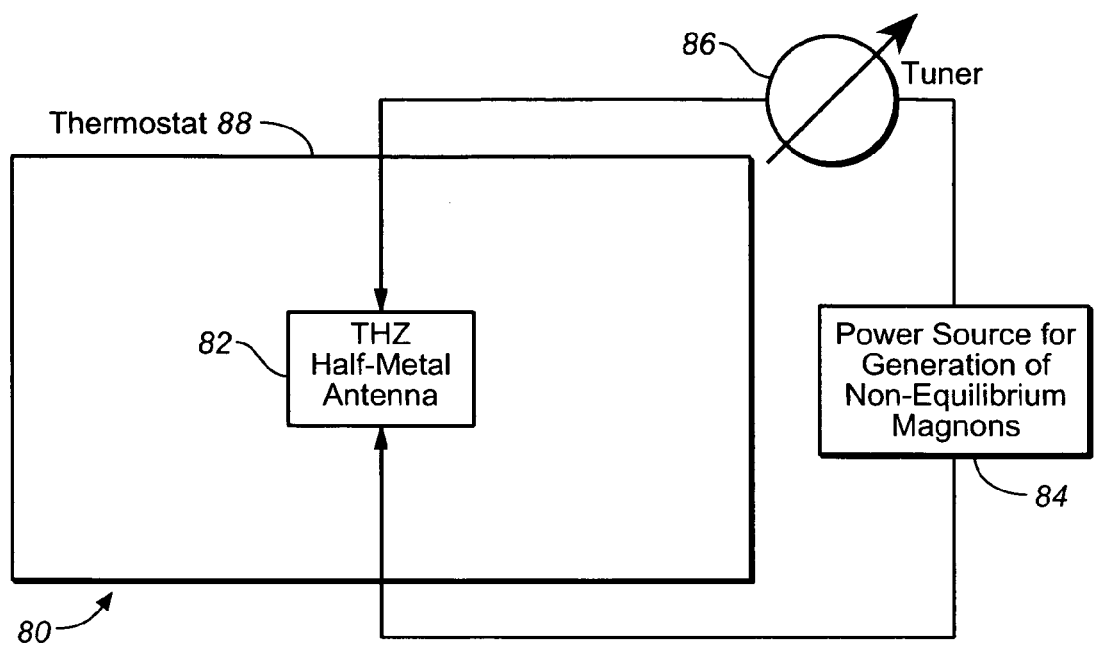
FIG. 4 illustrates an apparatus for tunable generation of terahertz photons comprising a terahertz antenna (placed in a thermostat) further comprising a magnon gain medium, a power source for generation of non-equilibrium magnons (an electric field generator, or a conventional laser), and a tuner in accordance with an embodiment of the present technology.

FIG. 4 illustrates an apparatus for tunable generation of terahertz photons 80 comprising a terahertz antenna 82 further comprising a magnon gain medium, a power source for generation of non-equilibrium magnons 84 (an electric field generator or a conventional laser), and a tuner 86 in accordance with an embodiment of the present technology. The terahertz antenna 82 is placed in the thermostat 88.

As an example the terahertz antenna 82 can be implemented by using a log-periodic antenna element that is capable of operation in 1-6 THz. Please, see "Antenna Engineering Handbook" edited by John L. Volakis, fourth edition, Mc Graw Hill books, 2007, pages 23-12; 23-13. Many other designs of terahertz antennas (a patch-antenna, a micro machined waveguide antenna, etc), can be used to implement the apparatus for tunable generation of terahertz photons 80 of the present technology.

In accordance with an embodiment of the present technology, the terahertz antenna 82 of FIG. 4 comprises a half-metallic ferromagnet (HMF) terahertz antenna.

In accordance with an embodiment of the present technology, the terahertz antenna 82 of FIG. 4 further comprises a spin-polarized Heusler alloy terahertz antenna.

In accordance with an embodiment of the present technology, the terahertz antenna 82 of FIG. 4 further comprises a spin-polarized Colossal magnetoresistance material terahertz antenna.

In accordance with an embodiment of the present technology, the terahertz antenna 82 of FIG. 4 further comprises a $CrO_2$ terahertz antenna.

In accordance with an embodiment of the present technology, the terahertz antenna 82 of FIG. 4 further comprises a $Sr_2FeMoO_6$ terahertz antenna.

In accordance with an embodiment of the present technology, the terahertz antenna 82 of FIG. 4 further comprises a $Fe_3O_4$ terahertz antenna.

As was fully disclosed above, the power source for generation of non-equilibrium magnons 84 (electrical field generator, or a conventional laser) applied to the terahertz antenna 82 comprising a magnon gain medium will generate non-equilibrium magnons in the terahertz antenna 82.

In the parent U.S. Pat. No. 7,430,074 "GENERATION OF TERAHERTZ WAVES", the generation of terahertz photons was caused by merging of non-equilibrium magnons in ferromagnetic dielectrics (like EuO). Therefore, the theory developed in the U.S. Pat. No. 7,430,074 is not directly applicable to the present technology that is focused on generation of terahertz photons caused by merging of non-equilibrium magnons in half-metals.

In metals, the generation of THz photons should be described by using Maxwell equations because the terahertz radiation experiences storing damping at distances equal to the photons wavelength in the metal, which is equal to the skin depth of the metals.

Skin depth is a measure of the distance an alternating current can penetrate beneath the surface of a conductor. When an electromagnetic wave interacts with a conductive material, mobile charges within the material are made to oscillate back and forth with the same frequency as the impinging fields. The movement of these charges, usually electrons, constitutes an alternating electric current, the magnitude of which is greatest at the conductor's surface. The decline in current density versus depth is known as the skin effect and the skin depth is a measure of the distance over which the current falls to 1/e of its original value. A gradual change in phase accompanies the change in magnitude, so that, at a given time and at appropriate depths, the current can be flowing in the opposite direction to that at the surface. The skin depth is a property of the material that varies with the frequency of the applied wave. It can be calculated from the relative permittivity and conductivity of the material and frequency of the wave.

Thus, in half-metals, the merging of non-equilibrium magnons will cause the generation of terahertz radiation with the frequency that has a maximum at the double magnon frequency. At the threshold pumping rates, the power of terahertz radiation should be an exponential function of pumping rates. If the magnon mirrors are implemented, as was disclosed above, the critical pumping rate is easier to achieve.

In the U.S. Pat. No. 7,440,178, the tunable generation of terahertz radiation was disclosed. This patent is incorporated by reference herein.

In accordance, with the '178 patent, the tuner 86 (of FIG. 4) can be implemented by using a Magnetic field in an embodiment of the present technology.

In accordance, with the '178 patent, the tuner 86 (of FIG. 4) can be implemented by using an electric field in an embodiment of the present technology.

In accordance, with the '178 patent, the tuner 86 (of FIG. 4) can be also implemented by using a source of hydrostatic pressure in an embodiment of the present technology.

More specifically, if the tuner 86 (of FIG. 4) is implemented by using a magnetic field, the energy of the magnons depends on the external magnetic field H via the gap in the magnon spectrum. Thus, the frequency of the generated terahertz radiation is also dependent on the external magnetic field.

The magnetic field-induced tunability $t_H = \partial f_r / \partial H$ is as follows:

$$t_H \approx g\mu_B/\pi \hbar = 0.056 \text{ THz/T}, \quad \text{(Eq. 18)}$$

where g is the g-factor (g≈2), and $\mu_B$ is the Bohr magneton. Thus, the field H=1 T tunes the maximum of radiation frequency of 1 THz by approximately 6%.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. An apparatus for terahertz photon generation comprising:
    (A) a terahertz antenna; said terahertz antenna further comprising a magnon gain medium; wherein said magnon gain medium supports generation of nonequilibrium magnons;
    and
    (B) a means for generating said nonequilibrium magnons in said magnon gain medium; wherein interaction between said nonequilibrium magnons causes generation of photons; and wherein said terahertz antenna emits said generated photons.

2. The apparatus of claim 1 further comprising:
    (C) a thermostat, wherein said magnon gain medium is placed in said thermostat, and wherein said thermostat is configured to maintain temperature of said magnon gain medium below a critical temperature.

3. The apparatus of claim 1, wherein said terahertz antenna further comprises:
    (A1) a log-periodic terahertz antenna.

4. The apparatus of claim 1, wherein said terahertz antenna further comprises:
    (A2) a micro machined waveguide terahertz antenna.

5. The apparatus of claim 1, wherein said terahertz antenna further comprises:
    (A3) a resonant terahertz antenna.

6. The apparatus of claim 1, wherein said terahertz antenna further comprises:
    (A4) a non-resonant terahertz antenna.

7. The apparatus of claim 1, wherein said magnon gain medium is selected from the group consisting of:
    {a ferromagnetic semiconductor; a dilute magnetic semiconductor (DMS); a half-metallic ferromagnet (HMF); and a ferromagnetic conductor, with a gap in the density of states of the minority electrons around the Fermi energy}.

8. The apparatus of claim 7, wherein said half-metallic ferromagnet (HMF) is selected from the group consisting of:
    {a spin-polarized Heusler alloy; a spin-polarized Colossal magnetoresistance material; $CrO_2$; $Sr_2FeMoO_6$; and $Fe_3O_4$}.

9. The apparatus of claim 7, wherein said terahertz antenna further comprises:
    a half-metallic ferromagnet (HMF) terahertz antenna.

10. The apparatus of claim 8, wherein said terahertz antenna further comprises:
    a spin-polarized Heusler alloy terahertz antenna.

11. The apparatus of claim 8, wherein said terahertz antenna further comprises:
    a spin-polarized Colossal magnetoresistance material terahertz antenna.

12. The apparatus of claim 8, wherein said terahertz antenna further comprises:
    a $CrO_2$ terahertz antenna.

13. The apparatus of claim 8, wherein said terahertz antenna further comprises:
    a $Sr_2FeMoO_6$ terahertz antenna.

14. The apparatus of claim 8, wherein said terahertz antenna further comprises:
    a $Fe_3O_4$ terahertz antenna.

15. The apparatus of claim 1, wherein said means (B) further comprises:
    (B1) a pumping means for pumping nonequilibrium electrons into said magnon gain medium, wherein propagation of said nonequilibrium electrons in said magnon gain medium causes generation of said nonequilibrium magnons.

16. The apparatus of claim 1, wherein said means (B) further comprises:
    (B2) an injection means for injecting nonequilibrium electrons into said magnon gain medium; wherein propagation of said nonequilibrium electrons in said magnon gain medium causes generation of said nonequilibrium magnons.

17. The apparatus of claim 15, wherein said (B1) pumping means further comprises:
    (B1, 1) a conventional laser means applied to said terahertz antenna; wherein said conventional laser means are configured to pump electrons into said magnon gain medium, wherein propagation of said nonequilibrium electrons in said magnon gain medium causes generation of said nonequilibrium magnons.

18. The apparatus of claim 16, wherein said (B2) injection means further comprises:
    (B2, 1) an electric field applied to said terahertz antenna for injecting nonequilibrium electrons into said magnon gain medium; wherein propagation of said nonequilibrium electrons in said magnon gain medium causes generation of said nonequilibrium magnons.

19. An apparatus for tunable terahertz generation comprising:
    (A) a terahertz antenna; said terahertz antenna further comprising a magnon gain medium; wherein said magnon gain medium supports generation of nonequilibrium magnons;
    (B) a means for generating said nonequilibrium magnons in said magnon gain medium; wherein interaction between said nonequilibrium magnons causes generation of photons; and wherein said terahertz antenna emits said generated photons;
    and
    (C) a means for tuning frequency of said photons emitted by said terahertz antenna.

20. The tunable terahertz generator of claim 19 further comprising:
    (D) a thermostat, wherein said magnon gain medium is placed in said thermostat, and wherein said thermostat is configured to maintain temperature of said magnon gain medium below a critical temperature.

21. The tunable terahertz generator of claim 19, wherein said magnon gain medium is selected from the group consisting of:
{a ferromagnetic semiconductor; a dilute magnetic semiconductor (DMS); a half-metallic ferromagnet (HMF); and a ferromagnetic conductor, with a gap in the density of states of the minority electrons around the Fermi energy}.

22. The tunable terahertz generator of claim 21, wherein said half-metallic ferromagnet (HMF) is selected from the group consisting of:
{a spin-polarized Heusler alloy; a spin-polarized Colossal magnetoresistance material; $CrO_2$; Sr2FeMoO6; and $Fe_3O_4$}.

23. The tunable terahertz generator of claim 19, wherein said means (B) further comprises:
(B1) a pumping means for pumping nonequilibrium electrons into said magnon gain medium, wherein propagation of said nonequilibrium electrons in said magnon gain medium causes generation of said nonequilibrium magnons.

24. The tunable terahertz generator of claim 19, wherein said means (B) further comprises:
(B2) an injection means for injecting nonequilibrium electrons into said magnon gain medium; wherein propagation of said nonequilibrium electrons in said magnon gain medium causes generation of said nonequilibrium magnons.

25. The tunable terahertz generator of claim 23, wherein said (B1) pumping means further comprises:
(B1, 1) a conventional laser means applied to said terahertz antenna; wherein said conventional laser means are configured to pump electrons into said magnon gain medium, wherein propagation of said nonequilibrium electrons in said magnon gain medium causes generation of said nonequilibrium magnons.

26. The tunable terahertz generator of claim 24, wherein said (B2) injection means further comprises:
(B2, 1) an electric field applied to said terahertz antenna for injecting nonequilibrium electrons into said magnon gain medium; wherein propagation of said nonequilibrium electrons in said magnon gain medium causes generation of said nonequilibrium magnons.

27. The tunable terahertz generator of claim 19, wherein said (C) means further comprises:
(C1) a means for applying an external magnetic field; and
(C2) a means for causing changes in a value of said external magnetic field.

28. The tunable terahertz generator of claim 19, wherein said (C) means further comprises:
(C3) a means for applying an external hydrostatic pressure; and
(C4) a means for causing changes in a value of said external hydrostatic pressure.

29. The tunable terahertz generator of claim 19, wherein said (C) means further comprises:
(C5) a means for applying an external electric field; and
(C6) a means for causing changes in a value of said external electric field.

30. A method of terahertz waves generation comprising:
(A) providing a terahertz generator comprising a terahertz antenna; said terahertz antenna further comprising a magnon gain medium; wherein said magnon gain medium supports generation of nonequilibrium magnons;
and
(B) applying a means for generating said nonequilibrium magnons in said magnon gain medium; wherein interaction between said nonequilibrium magnons causes generation of photons; wherein said terahertz antenna is configured to emit said photons generated in said magnon gain medium.

31. The method of claim 30 further comprising:
(C) providing a thermostat, wherein said magnon gain medium is placed in said thermostat, and wherein said thermostat is configured to maintain temperature of said magnon gain medium below a critical temperature.

32. The method of claim 30, wherein said step (A) further comprises:
(A1) selecting said magnon gain medium from the group consisting of: {a ferromagnetic semiconductor; a dilute magnetic semiconductor (DMS); a half-metallic ferromagnet (HMF); and a ferromagnetic conductor, with a gap in the density of states of the minority electrons around the Fermi energy}.

33. The method of claim 32, wherein said step (A1) further comprises:
(A1, 1) selecting said half-metallic ferromagnet (HMF) from the group consisting of: {a spin-polarized Heusler alloy; a spin-polarized Colossal magnetoresistance material; $CrO_2$; Sr2FeMoO6; and $Fe_3O_4$}.

34. The method of claim 30, wherein said step (B) further comprises:
(B1) pumping nonequilibrium electrons into said magnon gain medium, wherein propagation of said nonequilibrium electrons in said magnon gain medium causes generation of said nonequilibrium magnons.

35. The method of claim 30, wherein said step (B) further comprises:
(B2) injecting nonequilibrium electrons into said magnon gain medium; wherein propagation of said nonequilibrium electrons in said magnon gain medium causes generation of said nonequilibrium magnons.

36. The method of claim 34, wherein said step (B1) further comprises:
(B1, 1) applying a conventional laser means to said terahertz antenna; wherein said conventional laser means are configured to pump electrons into said magnon gain medium, wherein propagation of said nonequilibrium electrons in said magnon gain medium causes generation of said nonequilibrium magnons.

37. The method of claim 35, wherein said step (B2) further comprises:
(B2, 1) applying an electric field to said terahertz antenna for injecting nonequilibrium electrons into said magnon gain medium; wherein propagation of said nonequilibrium electrons in said magnon gain medium causes generation of said nonequilibrium magnons.

38. A method of tunable terahertz generation comprising:
(A) providing a terahertz generator comprising a terahertz antenna; said terahertz antenna further comprising a magnon gain medium; wherein said magnon gain medium supports generation of nonequilibrium magnons;
(B) applying a means for generating said nonequilibrium magnons in said magnon gain medium; wherein interaction between said nonequilibrium magnons causes generation of photons; wherein said terahertz antenna is configured to emit said photons generated in said magnon gain medium; and (C) tuning frequency of said photons emitted by said terahertz antenna.

39. The method of claim 38 further comprising:

(D) providing a thermostat, wherein said magnon gain medium is placed in said thermostat, and wherein said thermostat is configured to maintain temperature of said magnon gain medium below a critical temperature.

40. The method of claim 38, wherein said step (A) further comprises:

(A1) selecting said magnon gain medium from the group consisting of: {a ferromagnetic semiconductor; a dilute magnetic semiconductor (DMS); a half-metallic ferromagnet (HMF); and a ferromagnetic conductor, with a gap in the density of states of the minority electrons around the Fermi energy}.

41. The method of claim 40, wherein said step (A1) further comprises:

(A1, 1) selecting said half-metallic ferromagnet (HMF) from the group consisting of: {a spin-polarized Heusler alloy; a spin-polarized Colossal magnetoresistance material; $CrO_2$; $Sr_2FeMoO_6$; and $Fe_3O_4$}.

42. The method of claim 38, wherein said step (B) further comprises:

(B1) pumping nonequilibrium electrons into said magnon gain medium, wherein propagation of said nonequilibrium electrons in said magnon gain medium causes generation of said nonequilibrium magnons.

43. The method of claim 38, wherein said step (B) further comprises:

(B2) injecting nonequilibrium electrons into said magnon gain medium; wherein propagation of said nonequilibrium electrons in said magnon gain medium causes generation of said nonequilibrium magnons.

44. The method of claim 38, wherein said step (C) further comprises:

(C1) applying an external magnetic field; and (C2) causing changes in a value of said external magnetic field.

45. The method of claim 38, wherein said step (C) further comprises:

(C3) applying an external hydrostatic pressure; and (C4) causing changes in a value of said external hydrostatic pressure.

46. The method of claim 38, wherein said step (C) further comprises:

(C5) applying an external electric field; and (C6) causing changes in a value of said external electric field.

\* \* \* \* \*